United States Patent
Li et al.

(10) Patent No.: US 12,412,330 B2
(45) Date of Patent: Sep. 9, 2025

(54) PROGRAMMABLE PIXEL BLENDING PIPELINE, PROGRAMMABLE PIXEL BLENDING METHOD AND APPARATUS, AND STORAGE MEDIUM

(71) Applicant: Glenfly Tech Co., Ltd., Shanghai (CN)

(72) Inventors: Lei Li, Shanghai (CN); Fengxia Wu, Shanghai (CN)

(73) Assignee: GLENFLY TECH CO., LTD., Shanghai (CN)

( * ) Notice: Subject to any disclaimer, the term of this patent is extended or adjusted under 35 U.S.C. 154(b) by 307 days.

(21) Appl. No.: 18/219,441

(22) Filed: Jul. 7, 2023

(65) Prior Publication Data
US 2024/0013469 A1 Jan. 11, 2024

(30) Foreign Application Priority Data
Jul. 8, 2022 (CN) .......................... 202210801663.8

(51) Int. Cl.
*G06T 15/00* (2011.01)
*G06T 11/00* (2006.01)

(52) U.S. Cl.
CPC .......... *G06T 15/005* (2013.01); *G06T 11/001* (2013.01); *G06T 2210/32* (2013.01); *G06T 2210/44* (2013.01)

(58) Field of Classification Search
CPC . G06T 15/005; G06T 11/001; G06T 2210/32; G06T 2210/44
See application file for complete search history.

(56) References Cited

U.S. PATENT DOCUMENTS

2015/0179142 A1* 6/2015 Lehtinen ............... G06T 15/005
345/589
2016/0035129 A1 2/2016 Bolz et al.
(Continued)

FOREIGN PATENT DOCUMENTS

CN 102667814 A 9/2012
CN 102667814 B 9/2012
(Continued)

OTHER PUBLICATIONS

Office Action in Chinese Application No. 202210801663.8, mailed Aug. 28, 2024 (8 pages).

*Primary Examiner* — Kee M Tung
*Assistant Examiner* — Khoa Vu
(74) *Attorney, Agent, or Firm* — NIXON PEABODY LLP

(57) ABSTRACT

Programmable pixel blending method and apparatus, computer device, storage medium and computer program product are provided. The method includes: performing rasterization on a first triangle, a second triangle, and a third triangle via the raster unit to obtain triangle coverage information of each triangle; sending the triangle coverage information to the warp assembly unit and the warp reorder unit respectively; assembling, by the warp assembly unit, the first triangle and the second triangle into a first warp, and requesting a warp from a warp request interface based on information of the first warp; executing the first warp based on a warp information cache, a warp synchronization unit, the warp reorder unit, the pixel operation unit, the interpolation unit, and the execution unit; after the first warp is executed, continuing to assemble, by the warp assembly unit, the third triangle and completing a rendering of the third triangle.

13 Claims, 9 Drawing Sheets

(56) References Cited

U.S. PATENT DOCUMENTS

2017/0140499 A1    5/2017  Xiao et al.
2019/0066356 A1*  2/2019  Gierach ................. G06T 15/80

FOREIGN PATENT DOCUMENTS

| CN | 103886634 A | 6/2014 |
|----|-------------|--------|
| CN | 109196550 A | 1/2019 |
| CN | 109196550 B | 1/2019 |

* cited by examiner

PROGRAMMABLE PIXEL BLENDING PIPELINE, PROGRAMMABLE PIXEL BLENDING METHOD AND APPARATUS, AND STORAGE MEDIUM

This application claims priority under 35 U.S.C. § 119 to Chinese Patent Application No. 202210801663.8, filed on Jul. 8, 2022, the entire content of which is incorporated herein in its entirety.

TECHNICAL FIELD

The present application relates to the technical field of graphics rendering technology, and more particularly, relates to a programmable pixel blending pipeline, programmable pixel blending method and apparatus, a computer device, a storage medium and a computer program product.

BACKGROUND

Pixel blending is a process at an output and merge stage of a rendering pipeline, in which a conventional method is to use fixed functions to perform designated arithmetic operations on source colors and destination colors.

During a graphics rendering process, each pixel calls a pixel shader once and executes the instructions in the shader, ultimately outputting one or zero pixels. The output and merge stage may be functionally divided into two units: a depth test unit and a pixel operation unit. A function of the depth test unit is to test a depth value of a current pixel and a depth value stored in a storage unit. If the test is successful, the pixel is transmitted to the pixel operation unit; otherwise, the pixel is discarded. A function of the pixel operation unit is to write a color values of valid pixels into a rendering object. The storage space for storing depth values and color values is commonly referred to as a frame buffer. Data of the frame buffer being swapped and then displayed on a screen are referred to as a single frame image.

Existing pixel blending technologies may support conventional blending operation formulas, while some graphics libraries, such as advanced blending in OpenGL, require hardware support for more complex blending operation formulas. There are a numerous number of blending operation formulas, and at the same time, they all involve complex mathematical calculations, such as computing square roots in a SOFTLIGHT_KHR blending operation mode. Current pixel blending methods do not offer the flexibility to arbitrarily set blending equations, resulting in limited flexibility and scalability.

SUMMARY

In view of the defects existing in the prior art mentioned above, a programmable pixel blending pipeline, method, apparatus, computer device, storage medium and computer program product are provided which may improve flexibility and scalability.

In one aspect, a programmable pixel blending pipeline is provided by the present disclosure, which includes the following:
- a raster unit, which is configured to rasterize triangles;
- an output and merge unit, which is configured to combine a depth and a shading of an individual fragment are generated in the pixel shader, with the frame buffer;
- a warp assembly unit, which is configured to assemble hardware warps;
- an interpolation unit, which is configured to interpolate based on an input attribute of the pixel shader, and to send a signal indicating warp completion to an execution unit;
- a pixel shader construction unit, which is configured to allocate resources needed by a warp;
- an execution unit, which is configured to execute various instructions in a shader;
- a warp overlap check unit, which is configured to check whether different pixels in a warp overlap;
- a warp reorder unit, which is configured to sort different warps to ensure that multiple warps with overlapping pixels are executed in an order in which the multiple warps are launched; and
- a pixel operation unit, which is configured to read color values of pixels in a current warp from the frame buffer, assemble the color values into a quad and return the quad to the execution unit;

In accordance with one of the embodiments, the warp overlap check unit further includes the following;
- a triangle memory, which is configured to store all triangles in a previous warp; wherein stored information comprises, but is not limited to, position information, pixel coverage information, and information on whether a current triangle is valid;
- a control unit, which is configured to receive an input triangle and send a read request to the triangle memory;
- a memory read interface and a memory write interface, which are configured to represent a read interface and a write interface of the triangle memory, where the memory write interface is further used to receive a release request sent by an external module and to mark a triangle to be released as invalid; and
- a triangle overlap comparator, which is configured to determine whether there is an overlap between two triangles in screen space; wherein if there is a pixel overlap, the current warp that is being assembled is forcibly launched; otherwise, the input triangle is written to a memory and forwarded to a lower-level module;

In accordance with one of the embodiments, the warp reorder unit further includes: an input buffer, which is configured to receive and store input triangles;
- a warp splitting unit, which is configured to: determine, based on a quad number in warp information, a number of triangles in the input buffer which belong to a current warp; if one triangle spans two warps, split the triangle into two parts of sub-triangles, with a first part belonging to the current warp and a second part belonging to a next warp;
- an intermediate buffer, which is configured to store all triangles comprised in the current warp;
- a triangle memory, which is configured to store all triangles in a previous warp; wherein stored information comprises, but is not limited to, position information, pixel coverage information, and information on whether a current triangle is valid;
- a triangle memory control unit, which is configured to control read and write operations of the memory and to release specified triangles;
- a hit or miss testing unit, which is configured to: compare triangles in the current warp with those in the triangle memory; if there is an overlap between these two types of triangles in screen space, determine a hit; otherwise, determine a miss; wherein if the result is a hit, the current warp is blocked from entering the triangle memory; if the result is a miss, all triangles in the current warp are written into the triangle memory, and at the same time, a launch signal is sent to the pixel operation unit; and a traversal unit, which is configured to traverse all triangles in the intermediate buffer and write them to the triangle memory, while sending a launch signal to a lower-level module;

In accordance with one of the embodiments, the pixel operation unit specifically includes the following: an address calculation unit, which is configured to calculate an address of each pixel in a storage space;

a memory access interface, which is an interface to access a physical space where the frame buffer is located;

a pixel color buffer, which is configured to receive and store data returned by the frame buffer;

a quad assembly unit, which is configured to read color values of a current quad from a pixel buffer, and to assemble the color values into a quad;

a format conversion unit, which is configured to convert a pixel storage format of a rendering object into a data format required by the execution unit;

a quad merging unit, which is configured to assemble a maximum quantity of quad data according to a width of the interface and to send the quad data to the execution unit; wherein after the colors of all pixels in the current warp are returned to the execution unit, a signal indicating a completion of the warp is sent to the execution unit which starts executing an instruction in the warp after receiving the signal;

In a second aspect, a programmable pixel blending method is provided by the present disclosure. The method includes the following;

performing rasterization on a first triangle, a second triangle, and a third triangle via the raster unit to obtain triangle coverage information of each triangle;

sending the triangle coverage information to the warp assembly unit and the warp reorder unit respectively; assembling, by the warp assembly unit, the first triangle and the second triangle into a first warp, and requesting a warp from a warp request interface based on information of the first warp;

executing the first warp based on a warp information cache, a warp synchronization unit, the warp reorder unit, the pixel operation unit, the interpolation unit, and the execution unit;

after the first warp is executed, continuing to assemble, by the warp assembly unit, the third triangle and completing a rendering of the third triangle;

In accordance with one of the embodiments, the executing, the first warp based on a warp information cache, a warp synchronization unit, the warp reorder unit, the pixel operation unit, the interpolation unit, and the execution unit includes the following;

receiving and storing information of the first warp by the warp information cache; reading corresponding triangles from the input buffer based on the information of the first warp, and sending the information of the first warp to the warp reorder unit and the interpolation unit by the warp synchronization unit;

performing a hit or miss test based on the received information of the first warp information by the warp reorder unit; if the test result is a miss, sending a launch signal to the pixel operation unit;

reading color values of pixels in the first warp from the frame buffer and sending the color values to the execution unit, by the pixel operation unit;

the interpolation unit performs an interpolation on the pixels inside the triangle based on received triangle information of the second warp and a way of interpolation of an input attribute specified in the pixel shader, and sending an interpolation result to the execution unit by the interpolation unit;

executing, by the execution unit, various instructions in the pixel shader based on input attribute values of each quad in the information of the first warp and the color values returned by the pixel operation unit, and sending the color values to an output and merge unit after execution by the execution unit; and writing color data into the frame buffer and sending a request of releasing the first warp to the warp reorder unit, by the output and merge unit;

in accordance with one of the embodiments, the warp assembly unit continues to assemble, by the warp assembly unit, the third triangle and completing a rendering of the third triangle includes the following;

assembling the third triangle into a second warp by the warp assembly unit, and performing, by the warp reorder unit, a hit or miss test based on received information of the second warp; if a test result is a miss, sending a launch signal to the pixel operation unit;

reading color values of pixels in the second warp from the frame buffer and sending the color values to the execution unit, by the pixel operation unit;

performing, by the interpolation unit, interpolation on the pixels inside the triangle based on received triangle information of the second warp and a way of interpolation of an input attribute specified in the pixel shader, and sending an interpolation result to the execution unit by the interpolation unit;

executing, by the execution unit, various instructions in the pixel shader based on input attribute values of each quad in the information of the second warp and the color values returned by the pixel operation unit, and sending the color values to the output and merge unit after execution by the execution unit;

writing color data into the frame buffer and sending a request of releasing the second warp to the warp reorder unit, by the output and merge unit;

in a third aspect, a programmable pixel blending apparatus is provided by the present disclosure. The apparatus includes the following;

a rasterization module is configured to rasterize a first triangle, a second triangle, and a third triangle through a raster unit to obtain a corresponding triangle coverage information for each triangle;

an assembly module is configured to send the triangle coverage information to the warp assembly unit and the warp reorder unit respectively. The warp assembly unit assembles the first triangle and the second triangle into a first warp, and requests a warp from the warp request interface based on an information of the first warp;

an execution module is configured to execute the first warp based on a warp information cache, a warp synchronization unit, a warp reorder unit, a pixel operation unit, an interpolation unit, and an execution unit;

an output and merge module is configured to complete a rendering of the third triangle after the first warp is executed, while the warp assembly unit continues to assemble the third triangle;

in a fourth aspect, a computer device is further provided by the present disclosure includes a storage and a processor. A computer program is stored in the storage, and the following steps are implemented when the computer program is executed by the processor;

a first triangle, a second triangle, and a third triangle are rasterized using a raster unit to obtain triangle coverage information of each triangle;

the triangle coverage information is sent to the warp assembly unit and the warp reorder unit respectively. The warp assembly unit assembles the first triangle and the second triangle into a first warp, and requests a warp from the warp request interface based on the information of the first warp;

executing, the first warp based on a warp information cache, a warp synchronization unit, a warp reorder unit, a pixel operation unit, an interpolation unit, and an execution unit;

after the first warp is executed, the warp assembly unit continues to assemble the third triangle and complete a rendering of the third triangle;

in a fifth aspect, a computer readable storage medium is further provided by the present disclosure, and a computer program is stored therein. The following steps are implemented when the computer program is executed by the processor: A rasterization is performed on the first triangle, the second triangle, and the third triangle via the raster unit, and a triangle coverage information for each triangle is obtained. The triangle coverage information is sent to the warp assembly unit and the warp reorder unit respectively. The warp assembly unit assembles the first triangle and the second triangle into a first warp, and requests a warp from the warp request interface based on the information of the first warp. The first warp is executed based on a warp information cache, a warp synchronization unit, a warp reorder unit, a pixel operation unit, an interpolation unit, and an execution unit. After the first warp is executed, the warp assembly unit continues to assemble the third triangle and complete a rendering of the third triangle.

The above-mentioned programmable pixel blending method, apparatus, computer device, storage medium and computer program product, obtain triangle coverage information for each triangle by performing rasterization on a first triangle, a second triangle, and a third triangle via the raster unit to obtain triangle coverage information of each triangle; send the triangle coverage information to the warp assembly unit and the warp reorder unit respectively; assembling, by the warp assembly unit, the first triangle and the second triangle into a first warp, and requesting a warp from a warp request interface based on information of the first warp; execute the first warp based on a warp information cache, a warp synchronization unit, the warp reorder unit, the pixel operation unit, the interpolation unit, and the execution unit; after the first warp is executed, continue to assemble, by the warp assembly unit, the third triangle and complete a rendering of the third triangle.

DETAILED DESCRIPTION OF THE EMBODIMENTS

In order to make the objectives, technical solutions and advantages of the present disclosure clearer, the present disclosure is described in further detail below with reference to the accompanying drawings and embodiments. It should be understood that particular embodiments described herein are intended only to interpret the present disclosure and not intended to limit the present disclosure.

Figure 1:
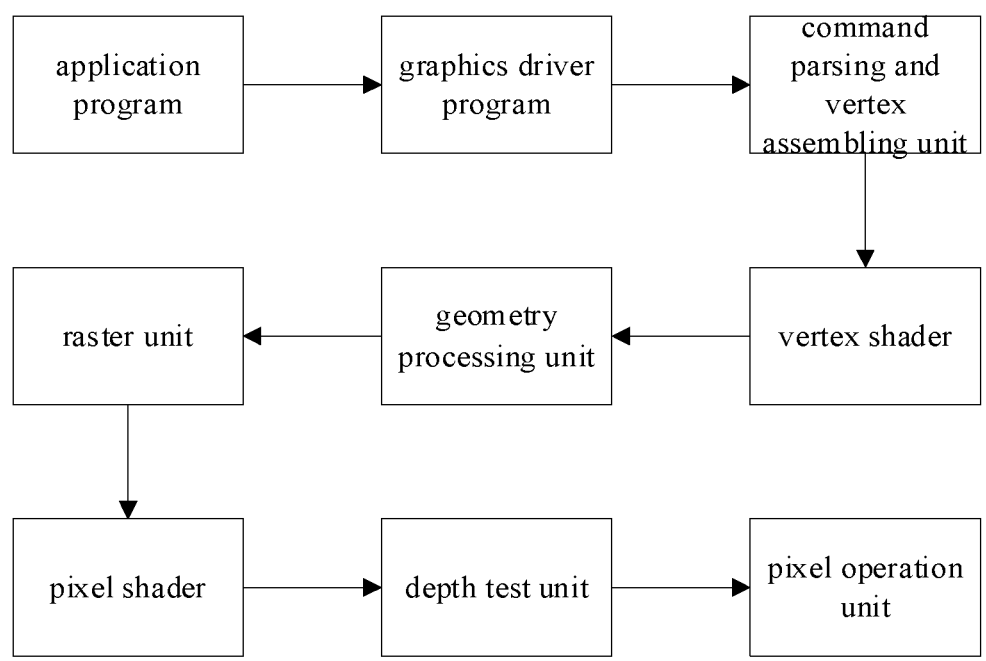
FIG. 1 is a schematic diagram of a graphics rendering pipeline in related technology.

A schematic diagram of a graphics rendering pipeline is shown in FIG. 1. In FIG. 1, an application program refers to an application related to graphics rendering. A graphics driver program is a configuration file written by a hardware manufacturer according to an operating system, which is a bridge between an upper-level application and a graphics card. A command parsing and vertex assembling unit has two functions, of which one is to receive commands from the graphics driver program and dispatch them to a specified hardware module, and the other is to assemble graphic elements according to a topology type set by the application and send vertices to a lower-level module. A vertex shader receives one vertex and outputs one vertex. A geometry processing unit is responsible for graphic element clipping, viewport transformation and triangle establishment. A raster unit is responsible for calculating coverage information, in a screen space, of different points in the graphic elements. A pixel shader receives one pixel and outputs one or zero pixel. A depth test unit is responsible for testing a depth value and determining whether to discard a pixel based on a test result. The pixel operation unit is responsible for writing valid pixels to a rendering object.

Pixel blending is usually performed in the pixel operation unit, performing an arithmetic operation between a color value output by the pixel shader and a value in the rendering object, and writing a result of the arithmetic operation as a final color value into the rendering object. Pixel blending may be used to solve the problem of rendering translucent objects in graphics. Different pixels may have different levels of transparency and a range of which may vary between complete transparency and opaqueness. Therefore, the color value of each pixel includes not only red, green, and blue (RGB) color channels but also an alpha channel, which is used to represent a transparency of a current pixel. A value of the alpha channel ranges from 0 to 1, where 0 refers to completely transparency and 1 refers to opaqueness. Therefore, in Direct3D, pixel blending is referred to as transparency blending. For example, if two triangles are rendered at the same position on the screen, with a first triangle being pure white and having an alpha value of 1, and a second triangle being pure black and having an alpha value of 0.5; a finally rendered color value of black is resulted without pixel blending, which is obviously incorrect. Nevertheless, after pixel blending, the color becomes gray.

To address the color blending issue in the graphics rendering pipeline, a Graphics Processing Unit (GPU) may perform calculation of a color blending formula through an Arithmetic Logic Unit (ALU) in the pixel operation unit and may write a final result into the rendering object. The following describes a formula of conventional color blending: $(A*B) \oplus (C*D)$.

A represents a source color, which is a color value output by the pixel shader; B represents a weight coefficient of the source color; C represents a destination color, which is a color value in a rendering object storage space; D represents a weight coefficient of the destination color; and $\oplus$ represents an operation code, including addition, subtraction, maximum, and minimum.

Figure 2:
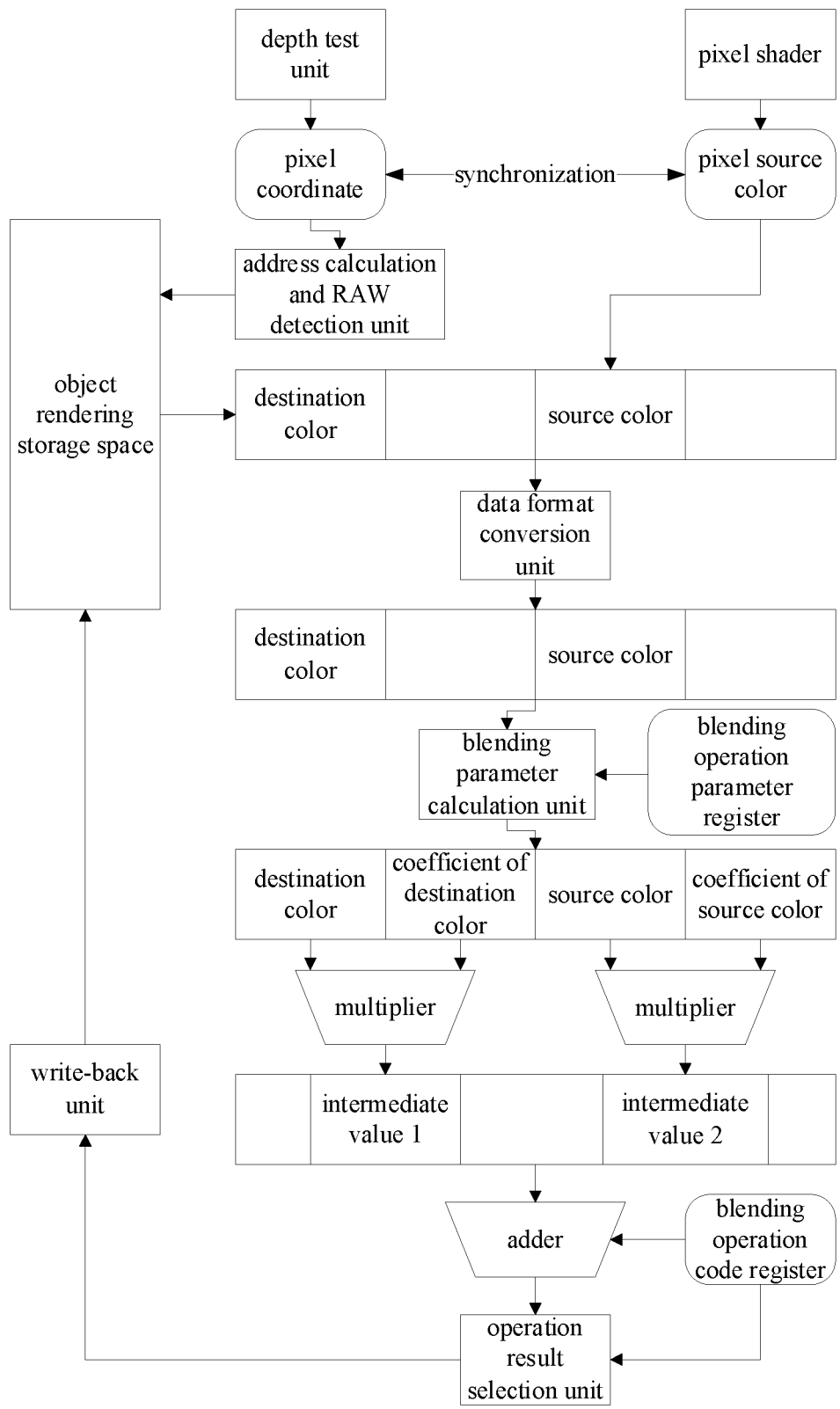
FIG. 2 is a schematic diagram of a hardware pipeline that implements color blending in related technology.

FIG. 2 shows a schematic diagram of a hardware pipeline that implements color blending. Functions of an address calculation and RAW detection unit in FIG. 2 are twofold. Address calculation calculates a storage address of a current pixel in a frame buffer space based on spatial coordinates of the current pixel and other properties of the rendering object. The RAW detection unit ensures that values read from the frame buffer are latest ones. That is, if the pixel is being written to, a read operation must wait until a write operation is completed before sending the read operation to a storage unit. Otherwise, the value read back is incorrect, therefore resulting in incorrect blending result. A data format conversion unit is configured to convert an output value of the pixel shader from a storage format to a data format required by the ALU for a blending operation. This design aims to decouple a color data type output by the shader from a data type of an ALU operation, making the data type of the ALU operation independent from an output data format of the pixel shader. A blending parameter calculation unit calculates, according to a blending coefficient specified in an application program, a source color and a destination color which are inputted, a blending coefficient of the source color and the destination color. The calculated blending coefficient is used as an input for a next stage of the pipeline. The ALU may perform an operation on an input value based on a value of a blending operation code and may transmit a result to the write-back unit.

A function of an operation result selection unit in FIG. 2 is to select a final operation result based on a type of the blending operation code and an output value of an adder, and to transmit the final operation result to the write-back unit. The write-back unit receives an output result of the blending operation and performs a format conversion thereon, where a target format is the storage format of the rendering object and a source format is a data format used by the ALU operation. The method in FIG. 2 may support conventional blending operation formulas, while some graphics libraries require hardware support for more complex blending operation formulas, e.g., advanced blending needs to be supported in OpenGL. There are a numerous number of blending operation formulas, and at the same time, complex mathematical calculations may be involved, such as computing square roots in a SOFTLIGHT_KHR blending operation mode. If the blending operation in FIG. 2 needs to support this feature, it requires complex arithmetic units and control logic. A programmable pixel blending method may solve this problem well.

Therefore, a blending operation pipeline method with a fixed pipeline usually contains shortcomings as follows: from a perspective of chip design, a fixed ALU may only support specific operation codes and data formats. For new data formats and operation codes, the ALU usually needs to be redesigned. From a perspective of chip power consumption, the more operation codes that need to be supported, the more transistors there are in the ALU, which increases power consumption of the chip.

Figure 3:
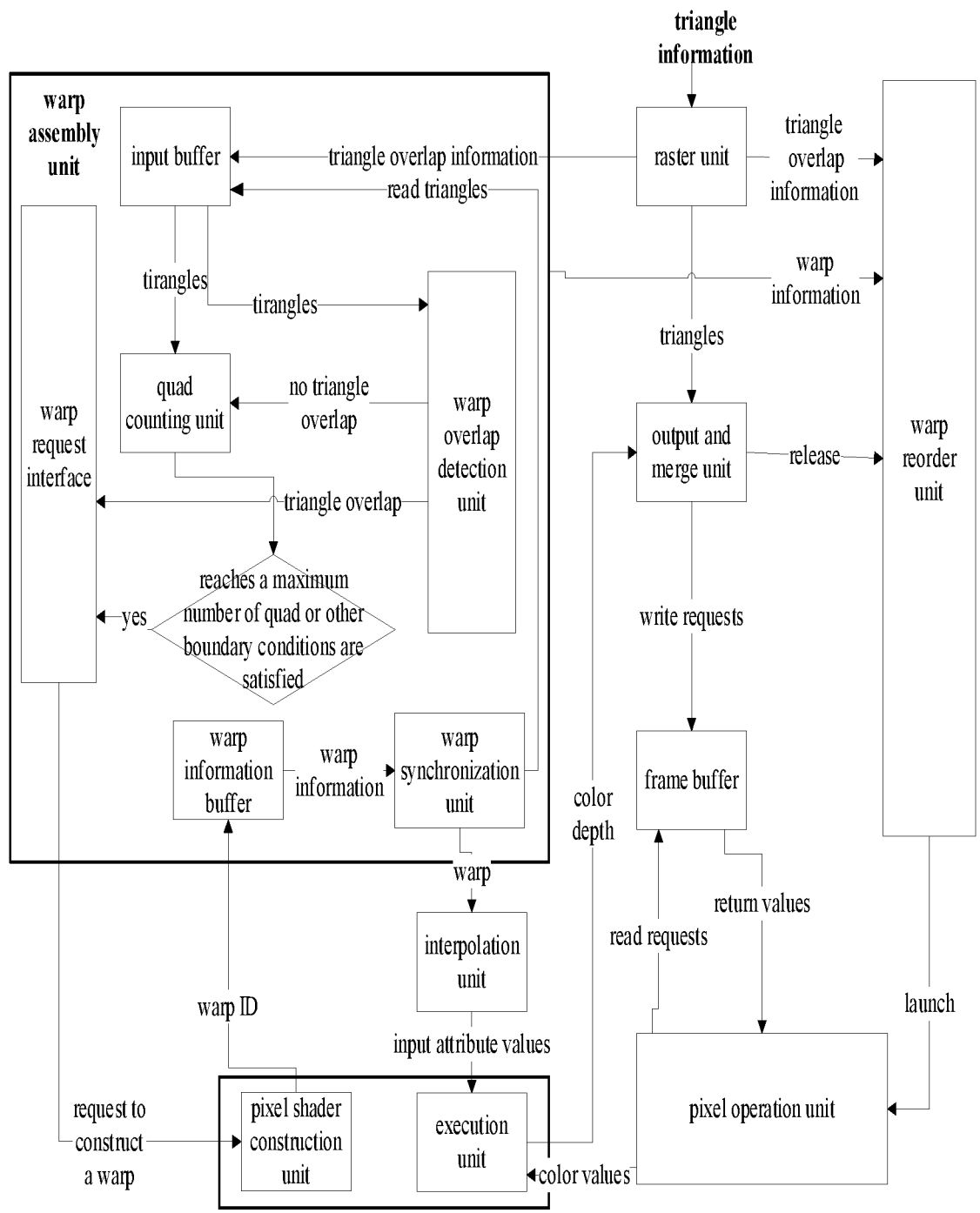
FIG. 3 is a programmable pixel blending pipeline according to an embodiment.

According to an embodiment, as shown in FIG. 3, a programmable pixel blending pipeline is provided, which includes the following:

a raster unit, which is configured to rasterize triangles;

an output and merge unit, which is configured to combine a depth and a shading of an individual fragment, which are generated in a pixel shader, with a frame buffer;

a warp assembly unit, which is configured to assemble hardware warps;

an interpolation unit, which is configured to interpolate based on an input attribute of the pixel shader, and to send a signal indicating warp completion to an execution unit;

a pixel shader construction unit, which is configured to allocate resources needed by a warp;

an execution unit, which is configured to execute various instructions in a shader;

a warp overlap check unit, which is configured to check whether different pixels in a warp overlap;

a warp reorder unit, which is configured to sort different warps to ensure that multiple warps with overlapping pixels are executed in an order in which the multiple warps are launched; and a pixel operation unit, which is configured to read color values of pixels in a current warp from the frame buffer, assemble the color values into a quad and return the quad to the execution unit.

Figure 4:
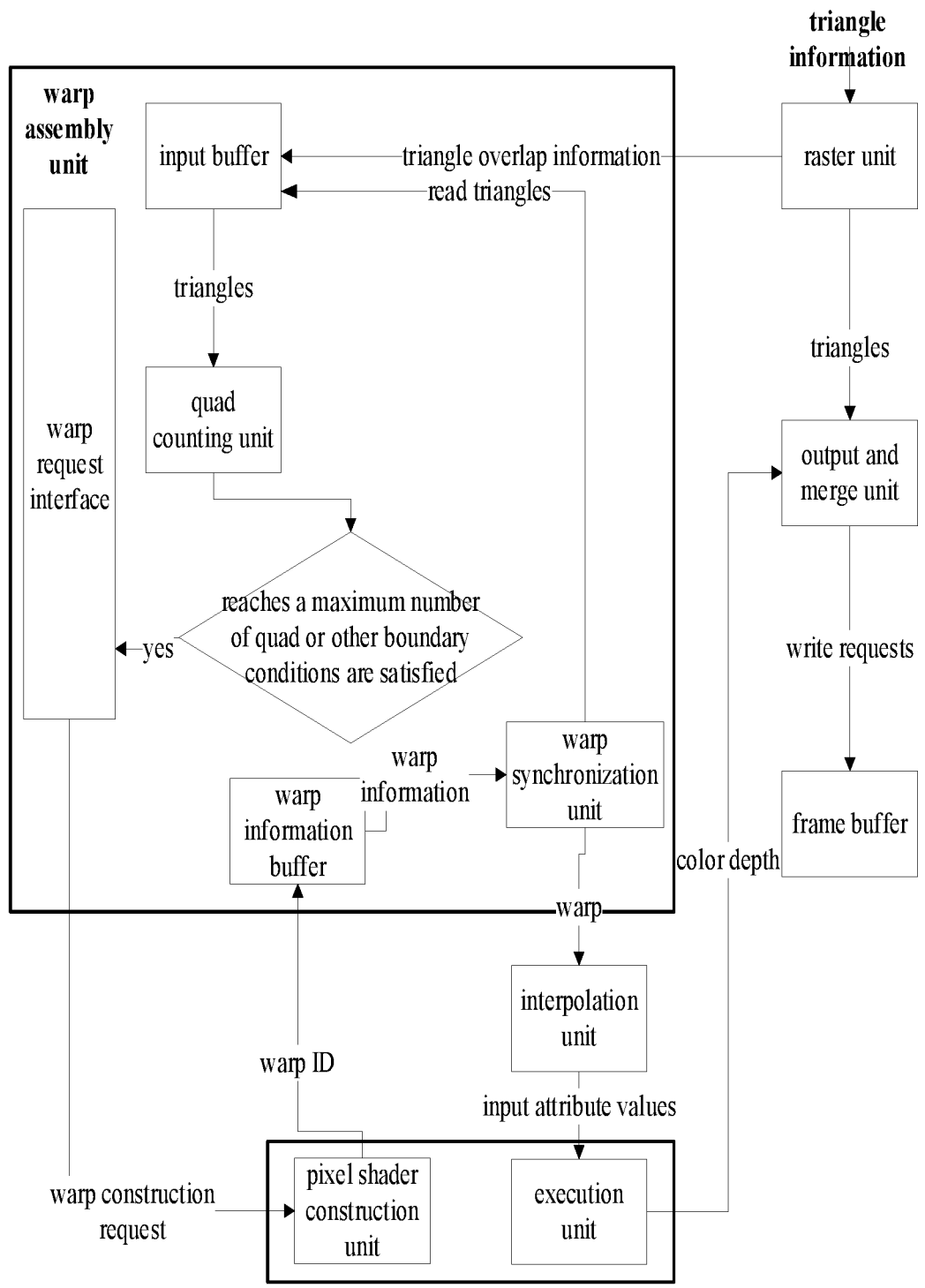
FIG. 4 is a pipeline in related technology that does not support programmable blending operations.

Specifically, as shown in FIG. 4, a pipeline that does not support programmable blending operations is provided, including: 1. A raster unit, whose function is to rasterize a triangle to determine which integer grid areas in screen coordinates are occupied by the triangle. 2. An output and merge unit, whose function is to combine a depth and a shading of an individual fragment, which are generated in the pixel shader, where the output and merge unit is usually divided into two parts in hardware, that is, a depth test unit and a pixel color operation unit. 3. A warp assembly unit, whose function is to assemble hardware warps, and the basic process is as follows: a quad counting unit counts how many valid quads (2×2 pixel blocks) are in a current triangle and updates a total number of quads; if the total number of quads is greater than or equal to a number of quads that may be accommodated in a warp, or a boundary condition other than the above (such as the current triangle being the last triangle in a rendering command) is met, a request for warp is sent to a warp request interface. 4. The warp request interface is responsible for sending a request for a warp to a pixel shader construction unit. Later, the warp assembly unit receives a warp ID returned by a warp construction unit, and writes the warp ID and a number of quads in the warp into a warp information buffer. After receiving warp information, a warp synchronization unit reads all the triangles to be input to a current warp from an input triangle buffer, packs triangle information and the warp information and sends them to an interpolation unit. 5. The interpolation unit interpolates based on an interpolation mode of an input attribute of the pixel shader, and a way of interpolation is to perform interpolation based on attributes of three vertices of a triangle to calculate attribute values of respective pixels in a tile contained in the current warp. The interpolation unit sends a signal indicating wrap completion to the execution unit, that is, after sending the last piece of data, the interpolation unit notifies the execution unit that the attribute values of the warp have been transmitted. 6. The pixel shader construction unit is responsible for allocating various resources needed by the warp, such as a general register and a warp slot. 7. The execution unit is responsible for executing various instructions in a shader. The execution unit receives an input value from an external module and outputs a final calculation result to a lower-level module. For example, the pixel shader receives input attribute values of each quad sent by an upper-level module, and outputs color and depth to a lower-level module.

Comparing to the pipeline in FIG. 4 that does not support programmable blending operations, the programmable pixel blending pipeline in FIG. 3 further includes the following: a warp overlap check unit, which is configured to check whether different pixels in a warp overlap; a warp reorder unit, which is configured to sort different warps to ensure that multiple warps with overlapping pixels are executed in an order in which the multiple warps are launched; and a pixel operation unit, which is configured to read color values of pixels in a current warp from the frame buffer, assemble the color values into a quad and return the quad to the execution unit.

According to the present embodiment, the pixel blending pipeline improves a diversity and scalability of pixel blending operations by detecting whether different pixels in a warp overlap with a warp overlap check unit, sorting different warps with a warp reorder unit, reading color values of the pixels in a current warp from the frame buffer with a pixel operation unit, assembling the color values into a quad and returning the quad to an execution unit. This allows the pixel blending pipeline to be adaptable to the novelty and uniqueness of new blending operation features required by future graphics libraries, and improves the flexibility and scalability of the pixel blending pipeline.

According to an embodiment, the warp overlap check unit specifically includes the following:
  a triangle memory, which is configured to store a triangle in a current warp that is being assembled, where stored information includes, but is not limited to, position information, pixel coverage information, and information on whether a current triangle is valid;
  a control unit, which is configured to receive an input triangle and send a read request to the triangle memory;
  a memory read interface and a memory write interface, which are configured to represent a read interface and a write interface of the triangle memory, where the memory write interface is further used to receive a release request sent by an external module and to mark a triangle to be released as invalid; and
  a triangle overlap comparator, which is configured to determine whether there is an overlap between two triangles in screen space; if there is a pixel overlap, the current warp that is being assembled is forcibly launched; otherwise, the input triangle is written to a memory and forwarded to a lower-level module.

Figure 5:
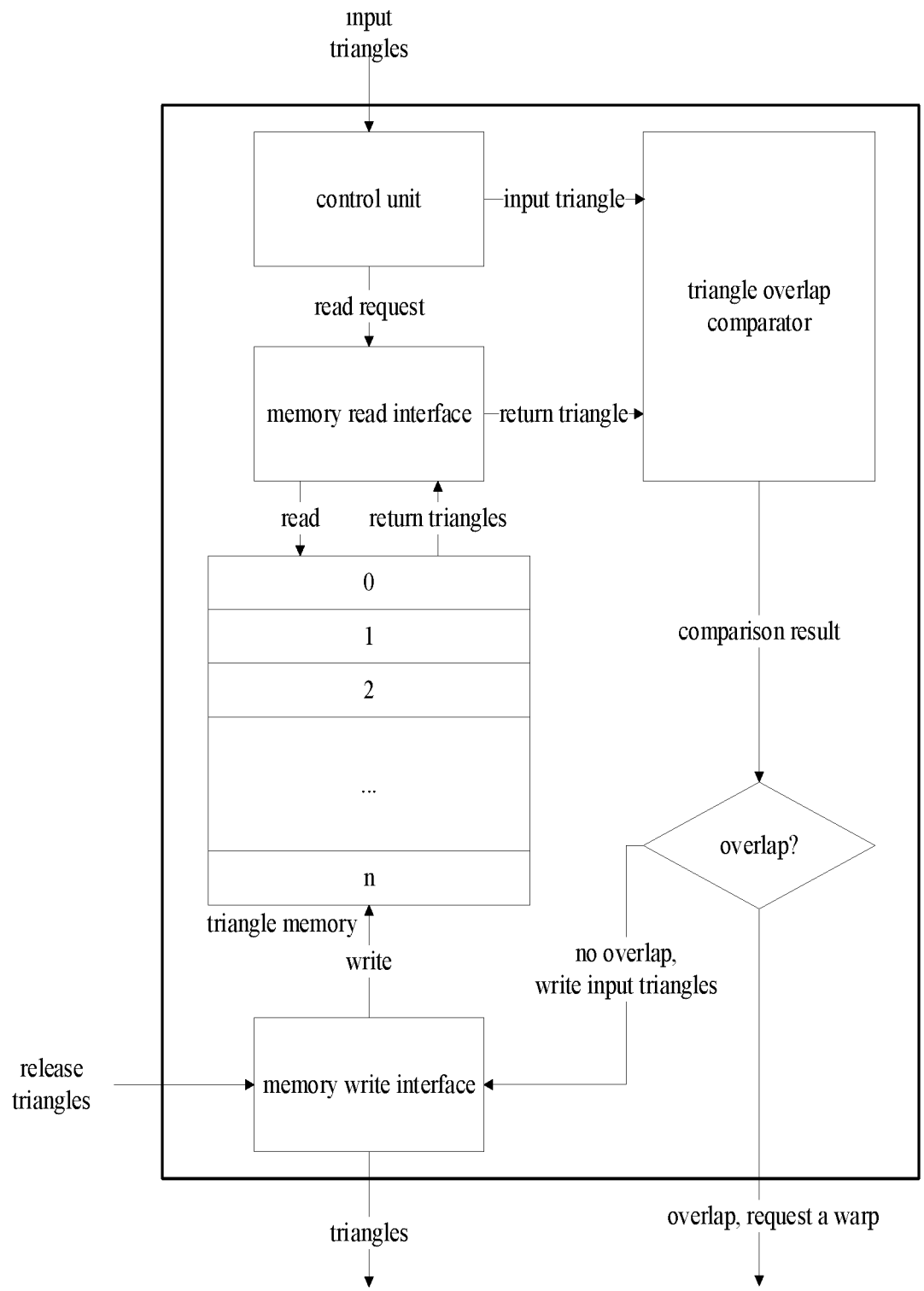
FIG. 5 is a warp overlap check unit according to an embodiment.

Specifically, FIG. 5 is a schematic diagram of a warp overlap check unit. As shown in FIG. 5, the warp overlap check unit includes a triangle memory, which stores a triangle in a warp that is currently being assembled; stored information includes, but is not limited to, position information, pixel coverage information, and information on whether a current triangle is valid. A control unit receives an input triangle, and send a read request to a triangle memory. Read and write interfaces of the triangle memory are represented by a memory read interface and a memory write interface, where the memory write interface is further used to receive a release request sent by an external module and to mark a triangle to be released as invalid. Via a triangle overlap comparator, it is determined whether there is an overlap between two triangles in screen space; if there is a pixel overlap, the warp that is currently being assembled is forcibly launched; otherwise, the input triangle is written to the memory and forwarded to a lower-level module.

According to the present embodiment, the warp overlap check unit checks whether there is an overlap between two triangles in screen space and forces the current warp to launch if there is a pixel overlap. Otherwise, the input triangle is written to the memory and forwarded to a lower-level module, achieving the effect of assembling different triangles into a warp.

According to an embodiment, the warp reorder unit includes: an input buffer which is configured to receive and store input triangles;
  a warp splitting unit, which is configured to: determine, based on a quad number in warp information, a number of triangles in the input buffer which belong to a current warp; if one triangle spans two warps, split the triangle into two parts of sub-triangles, with a first part belonging to the current warp and a second part belonging to a next warp;
  an intermediate buffer, which is configured to store all triangles included in the current warp;
  a triangle memory, which is configured to store all triangles in a previous warp, stored information includes, but is not limited to, position information, pixel coverage information, and information on whether a current triangle is valid;
  a triangle memory control unit, which is configured to control read and write operations of the memory and to release specified triangles;
  a hit or miss testing unit, which is configured to compare triangles in the current warp with those in the triangle memory; if there is an overlap between these two types of triangles in screen space, it is considered a hit; otherwise, it is a miss; if the result is a hit, the current warp is blocked from entering the triangle memory; if the result is a miss, all triangles in the current warp are written into the triangle memory, and at the same time, a launch signal is sent to the pixel operation unit; and
  a traversal unit, which is configured to traverse all triangles in the intermediate buffer and write them to the triangle memory, while sending a launch signal to a lower-level module.

Figure 6:
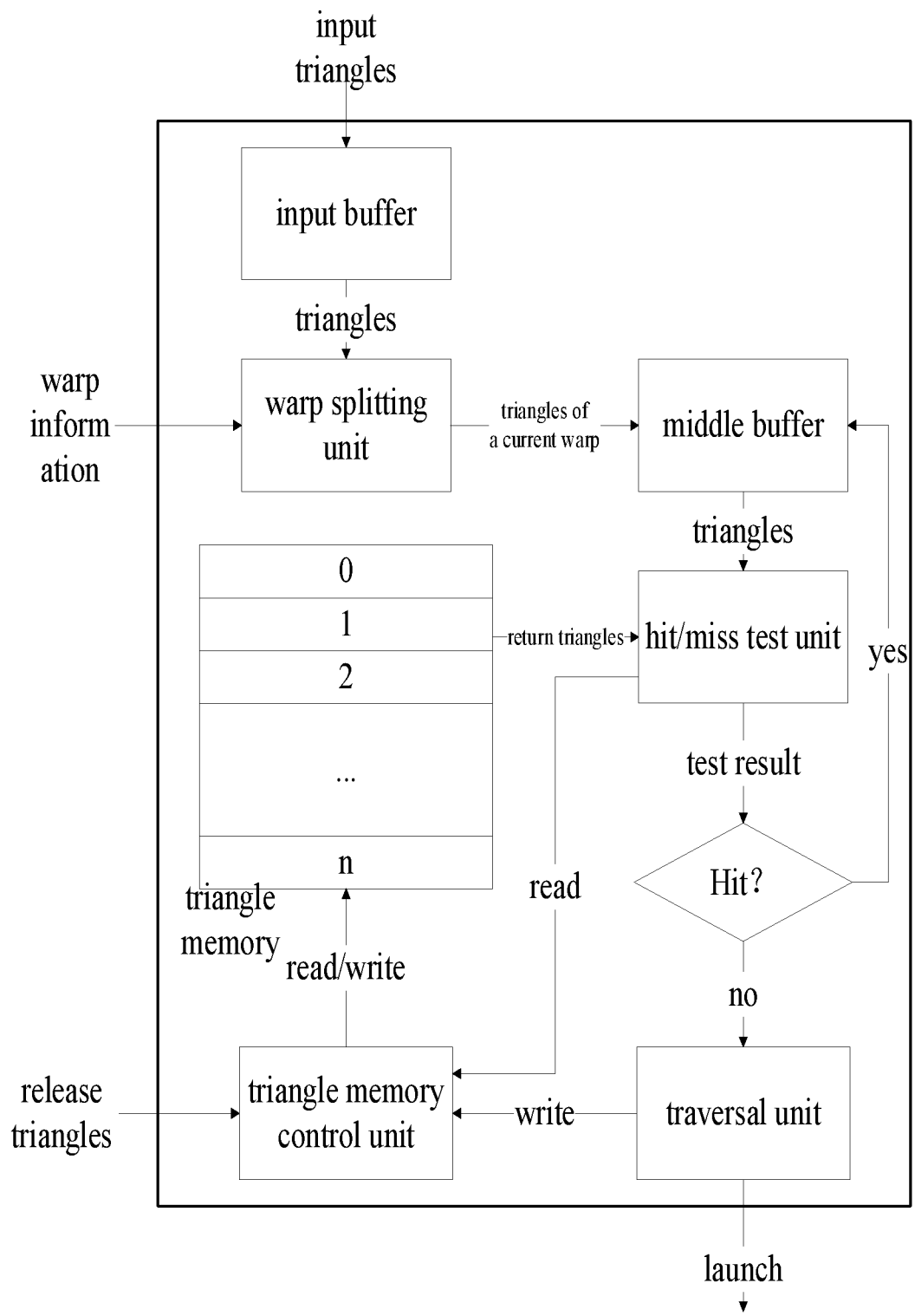
FIG. 6 is schematic diagram of a warp reorder unit according to an embodiment.

Specifically, FIG. 6 is a schematic diagram of a warp reorder unit. As shown in FIG. 6, the warp reorder unit includes an input buffer which is configured to receive and store input triangles. A warp splitting unit is configured to determine, based on a quad number in a warp information, a number of triangles which belong to a current warp in the input buffer. If a triangle spans two warps, the triangle is split into two parts, with the first part belonging to the current warp and the second part belonging to a next warp. An intermediate buffer is configured to store all triangles included in the current warp. A triangle memory is configured to store all triangles in a previous warp. Stored information includes, but is not limited to, position information, pixel coverage information, and information on whether the current triangle is valid. A triangle memory control unit is configured to control read and write operations of the memory and to release specified triangles. A hit/miss testing unit is configured to compare the triangles in the current warp with those in the triangle memory. If there is an overlap between these two types of triangles in screen space, it is considered a hit; otherwise, it is a miss. If the result is a hit, the current warp is blocked from entering the triangle memory. If the result is a miss, all triangles in the current warp are written into the triangle memory, and a launch signal is sent to the pixel operation unit. A traversal unit is configured to traverse all triangles in the middle buffer and write them to the triangle memory, while sending a launch signal to a lower-level module. Because there may be overlapping pixels in different warps, a warp in a ready state may be blocked until a previous warp completes execution, and only then may the warp read data from a rendering object storage space. Therefore, during a process of executing the warps, a hardware needs an reorder unit to ensure an execution order of the warps.

According to the present embodiment, during the process of executing the warps, the hardware ensures the execution order of the warps by providing the reorder unit. This allows the pixel blending pipeline to be adaptable to new blending operation features required by future graphics libraries, and improves the flexibility and scalability of the pixel blending pipeline.

According to an embodiment, the pixel operation unit includes the following: an address calculation unit, which is configured to calculate an address of each pixel in a storage space;
  a memory access interface, which is an interface to access a physical space where the frame buffer is located;
  a pixel color buffer, which is configured to receive and store data returned by the frame buffer;
  a quad assembly unit, which is configured to read color values of a current quad from a pixel buffer, and to assemble the color values into a quad;
  a format conversion unit, which is configured to convert a pixel storage format of a rendering object into a data format required by the execution unit;
  a quad merging unit, which is configured to assemble a maximum quantity of quad data according to a width of the interface and to send the quad data to the execution unit; after the colors of all pixels in the current warp are returned to the execution unit, a signal indicating a completion of the warp is sent to the execution unit which starts executing an instruction in the warp after receiving the signal.

Figure 7:
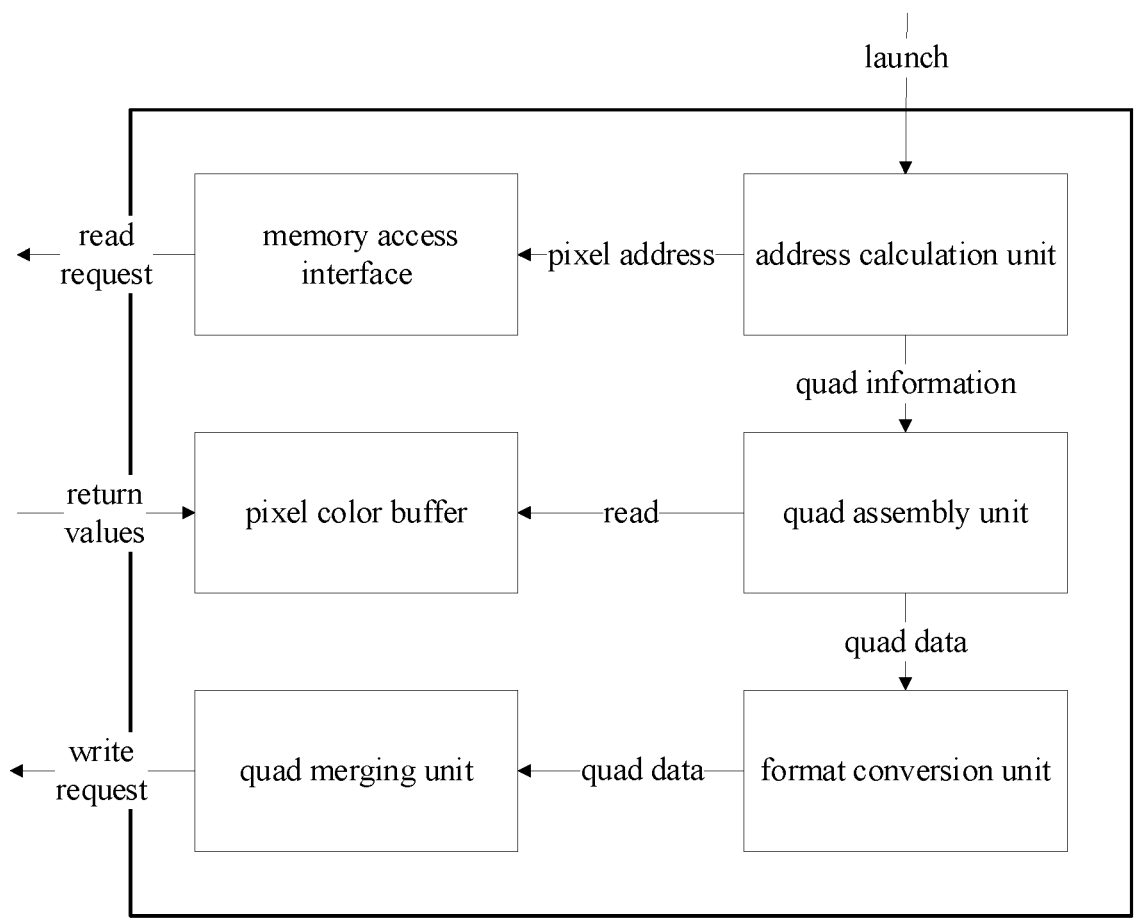
FIG. 7 is a schematic diagram of a pixel operation unit according to an embodiment.

Specifically, FIG. 7 is a schematic diagram of a pixel operation unit. As shown in FIG. 7, for a current warp, colors of each rendering object need to be read from the frame buffer and written back to a general register in the execution unit by a hardware module. After a last piece of data in the warp is returned to the general register, the execution unit needs to be notified that reading of needed data is completed and then it may start executing an instruction in the warp. The pixel operation unit includes: an address calculation unit which is configured to calculate an address of each pixel in the storage space; a memory access interface, which is an interface to access a physical space where the frame buffer is located; a pixel color buffer, which is configured to receive and store data returned by the frame buffer; a quad assembly unit, which is configured to read color values of a current quad from the pixel buffer, and to assemble the color values into a quad; a format conversion unit, which is configured to convert a pixel storage format of a rendering object into a data format required by the execution unit; a quad merging unit, which is configured to assemble a maximum quantity of quad data according to a width of the interface and to send the quad data to the execution unit. After the colors of all pixels in the current warp are returned to the execution unit, a signal indicating a completion of the warp is sent to the execution unit which starts executing an instruction in the warp after receiving the signal.

According to the present embodiment, for a current warp, colors of each rendering object need to be read from the frame buffer and written back to a general register in the execution unit via the pixel operation unit. After a last piece of data in the warp is returned to the general register, the execution unit needs to be notified that reading of needed data is completed and then the execution unit may start executing an instruction in the warp. This improves flexibility and scalability of the pixel blending pipeline.

Figure 8:
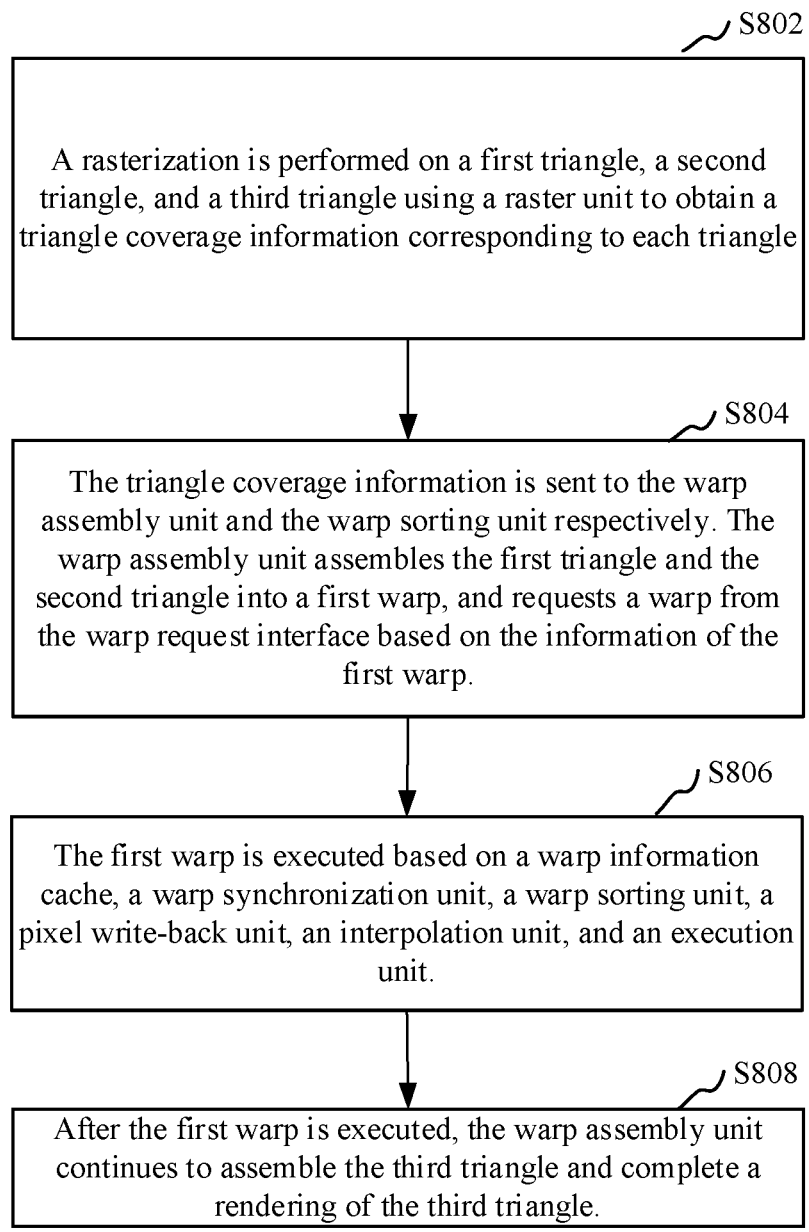
FIG. 8 is a programmable pixel blending method according to an embodiment.

According to an embodiment, as shown in FIG. 8, a programmable pixel blending method is provided, which includes the following steps.

In Step 802, a first triangle, a second triangle, and a third triangle are rasterized using a raster unit to obtain triangle coverage information of each triangle.

Specifically, rasterization is performed on each of the first triangle, the second triangle, and the third triangle via the raster unit, and triangle coverage information corresponding to each triangle is obtained. For example, triangle 1, triangle 2, and triangle 3 are respectively named T0, T1, and T2. A function of the raster unit is to rasterize a triangle, i.e., to determine which integer grid regions in screen coordinates are occupied by the triangle. The raster unit rasterizes T0, T1, and T2, triangle coverage information is sent in sequence to the warp assembly unit and the warp reorder unit, and triangle coverage information corresponding to each of the first triangle, the second triangle, and the third triangle is obtained.

In Step 804, the triangle coverage information is sent to the warp assembly unit and the warp reorder unit respectively. The warp assembly unit assembles the first triangle and the second triangle into a first warp, and requests a warp from the warp request interface based on information of the first warp.

Specifically, T0, T1, and T2 respectively enter the input buffer, and the triangle coverage information is sent to the warp assembly unit and the warp reorder unit respectively. The warp assembly unit assembles the first triangle (T0) and the second triangle (T1) into a first warp and requests a warp from the warp request interface based on information of the first warp. The warp assembly unit assembles T0 and T1 into a new warp, which is marked as Warp0, and sends a request for warp to the warp request interface.

In Step 806, the first warp is executed based on a warp information cache, a warp synchronization unit, the warp reorder unit, a pixel operation unit, an interpolation unit, and an execution unit.

Specifically, the information of the first warp is received and stored by the warp information cache. The warp synchronization unit reads corresponding triangles from the input buffer based on the information of the first warp and sends the information of the first warp to the warp reorder unit and the interpolation unit. The warp reorder unit performs a hit or miss test based on the received information of the first warp. If a test result is a miss, a launch signal is sent to the pixel operation unit. The pixel operation unit reads color values of pixels in the first warp from the frame buffer and sends the color values to the execution unit. The interpolation unit performs interpolation on the pixels inside the triangles based on received triangle information of the first warp and a way of interpolation of an input attribute specified in the pixel shader, and sends an interpolation result to the execution unit. The execution unit executes various instructions in the pixel shader based on input attribute values of each quad in the information of the first warp and the color values returned by the pixel operation unit, and sends the color values to an output and merge unit after execution of the instructions. Finally, the output and merge unit writes color data into the frame buffer and sends a request of releasing the first warp to the warp reorder unit.

In Step 808, after the first warp is executed, the warp assembly unit continues to assemble the third triangle and complete a rendering of the third triangle.

Specifically, after the first warp Warp0 is executed, the warp assembly unit assembles the third triangle (T2) into a second warp Warp1. The warp reorder unit performs a hit or miss test based on received information of the second warp. If a test result is a miss, a launch signal is sent to the pixel operation unit. The pixel operation unit reads color values of pixels in the second warp Warp1 from the frame buffer and sends the color values to the execution unit. The interpolation unit performs interpolation on the pixels inside the triangles based on received triangle information of the second warp Warp1 and a way of interpolation of an input attribute specified in the pixel shader, and sends an interpolation result to the execution unit. The execution unit executes various instructions in the pixel shader based on input attribute values of each quad in the information of the second warp and the color values returned by the pixel operation unit, and sends the color values to the output and merge unit after execution of the instructions. The output and merge unit writes color data into the frame buffer and sends a request of releasing the second warp to the warp reorder unit, and completes a rendering of the third triangle (T2).

In the above-mentioned programmable pixel blending method, a rasterization is performed on the first triangle, the second triangle, and the third triangle via the raster unit, and a triangle coverage information for each triangle is obtained. The triangle coverage information is sent to the warp assembly unit and the warp reorder unit respectively. The warp assembly unit assembles the first triangle and the second triangle into a first warp, and requests a warp from the warp request interface based on the information of the first warp. The first warp is executed based on the warp information cache, the warp synchronization unit, the warp reorder unit, the pixel operation unit, the interpolation unit, and the execution unit. After the first warp is executed, the warp assembly unit continues to assemble the third triangle and completes a rendering of the third triangle, thereby improving a flexibility and scalability of pixel blending.

According to an embodiment, the execution of the first warp based on the warp information cache, the warp synchronization unit, the warp reorder unit, the pixel operation unit, the interpolation unit, and the execution unit includes the following.

The warp information cache receives and stores information of the first warp. The warp synchronization unit reads corresponding triangles from the input buffer based on the information of the first warp, and sends the information of the first warp to the warp reorder unit and the interpolation unit.

The warp reorder unit performs a hit or miss test based on the received information of the first warp information. If the test result is a miss, a launch signal is sent by the warp reorder unit to the pixel operation unit.

The pixel operation unit reads color values of pixels in the first warp from the frame buffer and sends the color values to the execution unit.

The interpolation unit performs interpolation on the pixels inside the triangles based on received triangle information of the first warp and a way of interpolation of an input attribute specified in the pixel shader, and sends an interpolation result to the execution unit.

The execution unit executes various instructions in the pixel shader based on input attribute values of each quad in the information of the first warp and the color values returned by the pixel operation unit, and sends the color values to an output and merge unit after execution of the instructions.

The output and merge unit writes color data into the frame buffer and sends a request of releasing the first warp to the warp reorder unit.

Specifically, the warp information cache receives and stores an information of the first warp. The warp synchronization unit reads corresponding triangles, namely the first triangle and the second triangle, from the input buffer based on the information of the first warp and sends the information of the first warp to the warp reorder unit and the interpolation unit. The warp reorder unit performs a hit/miss test based on the received information of the first warp. Through the test, if a test result is a miss, a launch signal is sent to the pixel operation unit. The interpolation unit performs an interpolation on the pixels inside the triangles based on a received triangle information of the first warp and a way of interpolation with input attributes specified in the pixel shader, and sends an interpolation result to the execution unit. The pixel operation unit reads a color values of pixels in the first warp from the frame buffer and sends the color values to the execution unit. The execution unit executes various instructions in the pixel shader based on input attribute values of each quad in the information of the first warp and the color values returned by the pixel operation unit, and sends the color values to an output and merge unit after execution. The output and merge unit writes a color data into the frame buffer and sends a request to release the first warp to the warp reorder unit.

According to the present embodiment, the warp information cache receives and stores information of the first warp; the warp synchronization unit reads corresponding triangles from the input buffer based on the information of the first warp, and sends the information of the first warp to the warp reorder unit and the interpolation unit; then, color values are obtained through the pixel operation unit, the interpolation unit, and the execution unit; finally, color data is written into the frame buffer, and the first warp is released, which completes an execution of the first warp.

According to an embodiment, the warp assembly unit continues to assemble the third triangle and completes a rendering of the third triangle as follows.

The warp assembly unit assembles the third triangle into a second warp, and the warp reorder unit performs a hit or miss test based on received information of the second warp. If a test result is a miss, a launch signal is sent to the pixel operation unit.

The pixel operation unit reads color values of pixels in the second warp from the frame buffer and sends the color values to the execution unit.

The interpolation unit performs interpolation on the pixels inside the triangle based on received triangle information of the second warp and a way of interpolation of an input attribute specified in the pixel shader, and sends an interpolation result to the execution unit.

The execution unit executes various instructions in the pixel shader based on input attribute values of each quad in the information of the second warp and the color values returned by the pixel operation unit, and sends the color values to the output and merge unit after execution of the instructions.

The output and merge unit writes color data into the frame buffer and sends a request of releasing the second warp to the warp reorder unit.

Specifically, after the first warp is executed, the warp assembly unit assembles a third triangle T2 into the second warp Warp1. The warp reorder unit performs a hit/miss test based on a received information of the second warp. If a test result is a miss, a launch signal is sent to the pixel operation unit. The pixel operation unit reads a color values of pixels in the second warp Warp1 from the frame buffer and sends the color values to the execution unit. The interpolation unit performs an interpolation on the pixels inside the triangles based on a received triangle information of the second warp and a way of interpolation with input attributes specified in the pixel shader, and sends an interpolation result to the execution unit. The execution unit executes various instructions in the pixel shader based on input attribute values of each quad in the information of the second warp and the color values returned by the pixel operation unit, and sends the color values to the output and merge unit after execution. The output and merge unit writes a color data into the frame buffer and sends a request to release the second warp Warp1 to the warp reorder unit.

According to the present embodiment, upon completing an execution of the first warp, the second warp is executed based on the warp information cache, the warp synchronization unit, the warp reorder unit, the pixel operation unit, the interpolation unit, and the execution unit to complete a rendering of the third triangle, thereby improving flexibility and scalability of pixel blending.

It is to be understood that, although steps in the flow charts involved in the above-mentioned embodiments are displayed in sequence based on indication of arrows, these steps are not necessarily executed sequentially based on the sequence indicated by the arrows. Unless otherwise explicitly specified herein, sequence to execute the steps is not strictly limited, and the steps may be executed in other sequences. In addition, at least some steps in in the flow charts involved in the above-mentioned embodiments may include multiple steps or multiple stages, and these steps or stages are not necessarily executed at the same moment, but may be executed at different moments. These steps or stages are not necessarily executed in sequence, but may be executed in turn or alternately with another step or at least a part of steps or stages of another step.

Based on a same inventive concept, a programmable pixel blending apparatus that is configured to implement the above-mentioned programmable pixel blending method is further provided according to an embodiment of the present disclosure. The implementation solution to the problem provided by the apparatus is similar to the implementation solution described in the above-mentioned method. Therefore, specific limitations of one or more embodiments of the programmable pixel blending apparatus provided below may be referred to the limitation of the above-mentioned programmable pixel blending method, hence are not to be repeated herein.

Figure 9:
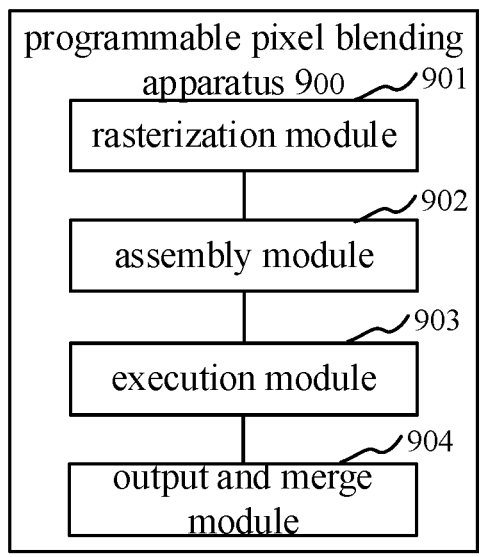
FIG. 9 is a programmable pixel blending apparatus according to an embodiment.

According to an embodiment, as shown in FIG. 9, a programmable pixel blending apparatus is provided, including a rasterization module 901, an assembly module 902, an execution module 903, and an output and merge module 904.

The rasterization module 901 is configured to rasterize a first triangle, a second triangle, and a third triangle through a raster unit to obtain triangle coverage information corresponding to each triangle.

The assembly module 902 is configured to send the triangle coverage information to a warp assembly unit and a warp reorder unit respectively. The warp assembly unit assembles the first triangle and the second triangle into a first warp, and requests a warp from a warp request interface based on information of the first warp.

The execution module 903 is configured to execute the first warp based on a warp information cache, a warp synchronization unit, the warp reorder unit, a pixel operation unit, an interpolation unit, and an execution unit.

The output and merge module 904 is configured to enable the warp assembly unit to continue to assemble the third triangle after completion of execution of the first warp, and complete a rendering of the third triangle.

With the above-mentioned programmable pixel blending apparatus, through performing a rasterization on the first triangle, the second triangle, and the third triangle via the raster unit, triangle coverage information for each triangle is obtained. The triangle coverage information is sent to the warp assembly unit and the warp reorder unit respectively. The warp assembly unit assembles the first triangle and the second triangle into a first warp, and requests a warp from the warp request interface based on the information of the first warp. the first warp is executed based on the warp information cache, the warp synchronization unit, the warp reorder unit, the pixel operation unit, the interpolation unit, and the execution unit. After the first warp is executed, the warp assembly unit continues to assemble the third triangle and completes a rendering of the third triangle, thereby improving a flexibility and scalability of pixel blending.

Respective modules in the above-mentioned programmable pixel blending apparatus may be implemented in whole or in part by software, hardware, and a combination of hardware and software. The above-mentioned each module can be embedded in the form of hardware in a processor in a computer device, or be independent from a processor in a computer device, or be stored in the form of software in a memory of a computer device, so as to make it easier for the processor to call and execute an operation corresponding to each module.

Figure 10:
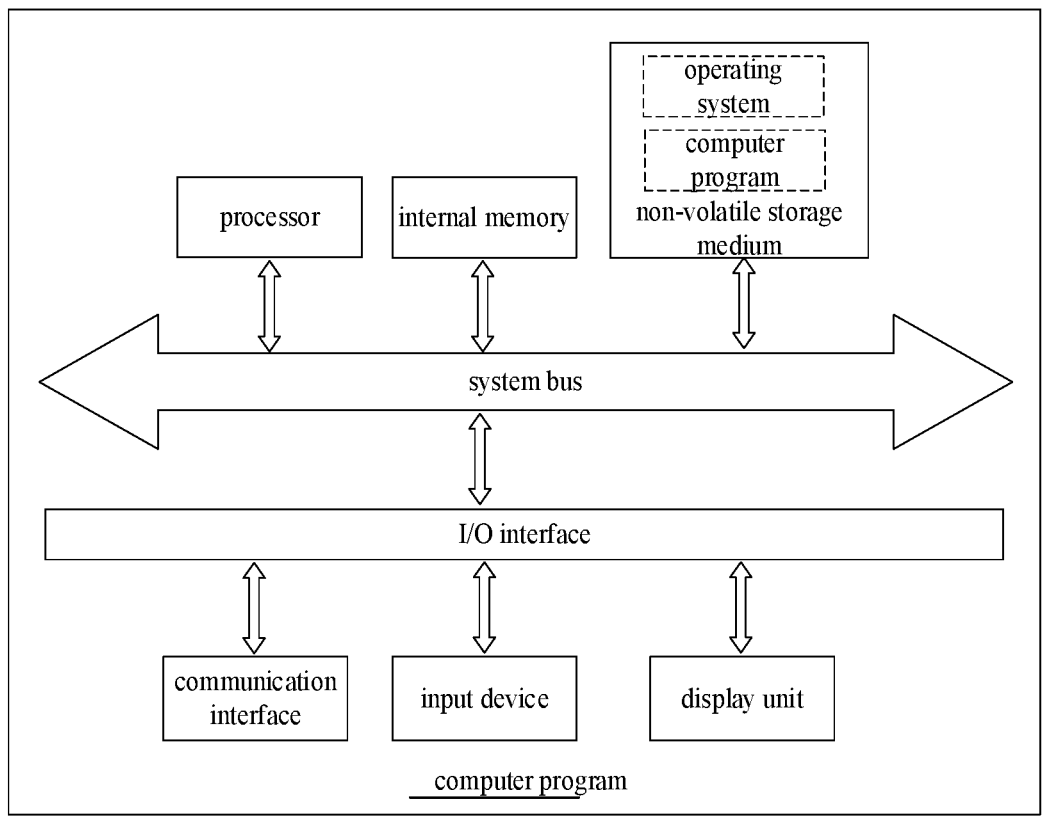
FIG. 10 is an internal structural diagram of a computer device according to an embodiment.

According to an embodiment, a computer device is provided, which may be a server, and an internal structure of which is shown in FIG. 10. The computer device includes a processor, a memory, and a network interface, which are connected by a system bus. The processor of the computer device is configured to provide computing and controlling capabilities. The memory of the computer device includes a non-volatile storage medium and an internal memory. The non-volatile storage medium stores an operating system, a computer program, and a database. The internal memory provides an environment for running of the operating system and the computer program in the non-volatile storage medium. The network interface of the computer device is configured to communicate with an external terminal through a network connection. The computer program is executed by the processor to implement a programmable pixel blending method.

Those of ordinary skills in the art may understand that, the structure shown in FIG. 10 is only a block diagram of a part of a structure related to a solution of the present disclosure and does not limit the computer device to which the solution of the present disclosure is applied. Specifically, the computer device may include more or less components than those in the drawings, or include a combination of some components, or include different component layouts.

According to an embodiment, a computer device is provided, which includes a storage and a processor. A computer program is stored in the storage, and the following steps are implemented when the computer program is executed by the processor: performing a rasterization on a first triangle, a second triangle, and a third triangle via the raster unit, and obtaining triangle coverage information for each triangle; sending the triangle coverage information to the warp assembly unit and the warp reorder unit respectively; the warp assembly unit assembling the first triangle and the second triangle into a first warp, and requesting a warp from the warp request interface based on the information of the first warp; executing the first warp based on a warp information cache, a warp synchronization unit, a warp reorder unit, a pixel operation unit, an interpolation unit, and an execution unit; and after the first warp is executed, the warp assembly unit continuing to assemble the third triangle and completing a rendering of the third triangle.

According to an embodiment, the following steps are further implemented by the processor when the computer program is executed. The warp assembly unit assembles the third triangle into a second warp, and the warp reorder unit performs a hit or miss testing based on a received information of the second warp. If a test result is a miss, a launch signal is sent to the pixel operation unit. The pixel operation unit reads a color values of pixels in the second warp from the frame buffer and sends the color values to the execution unit. The interpolation unit performs an interpolation on the pixels inside the triangles based on a received triangle information of the second warp and a way of interpolation with input attributes specified in the pixel shader, and sends an interpolation result to the execution unit. The execution unit executes various instructions in the pixel shader based on input attribute values of each quad in the information of the second warp and the color values returned by the pixel operation unit, and sends the color values to the output and merge unit after execution. The output and merge unit writes a color data into the frame buffer and sends a request to release the second warp to the warp reorder unit.

According to an embodiment, a computer readable storage medium is provided, and a computer program is stored therein. The following steps are implemented when the computer program is executed by a processor. A rasterization is performed on the first triangle, the second triangle, and the third triangle via the raster unit, and a triangle coverage information for each triangle is obtained. The triangle coverage information is sent to the warp assembly unit and the warp reorder unit respectively. The warp assembly unit assembles the first triangle and the second triangle into a first warp, and requests a warp from the warp request interface based on the information of the first warp. The first warp is executed based on a warp information cache, a warp synchronization unit, a warp reorder unit, a pixel operation unit, an interpolation unit, and an execution unit. After the first warp is executed, the warp assembly unit continues to assemble the third triangle and complete a rendering of the third triangle.

According to an embodiment, the following steps are further implemented when the computer program is executed by the processor. The warp assembly unit assembles the third triangle into a second warp, and the warp reorder unit performs a hit or miss testing based on a received information of the second warp. If a test result is a miss, a launch signal is sent to the pixel operation unit. The pixel operation unit reads a color values of pixels in the second warp from the frame buffer and sends the color values to the execution unit. The interpolation unit performs an interpolation on the pixels inside the triangles based on a received triangle information of the second warp and a way of interpolation with input attributes specified in the pixel shader, and sends an interpolation result to the execution unit. The execution unit executes various instructions in the pixel shader based on input attribute values of each quad in the information of the second warp and the color values returned by the pixel operation unit, and sends the color values to the output and merge unit after execution. The output and merge unit writes color data into the frame buffer and sends a request of releasing the second warp to the warp reorder unit.

It should be noted that, user information involved in the present disclosure (including, but not limited to, user device information, user personal information, and the like) and data (including, but not limited to, analyzed data, stored data, displayed data, and the like) refer to information and data which are authorized by the user or by all parties.

Those with ordinary skill in the art may understand that all or some of the above-mentioned embodiments may be implemented by a computer program instructing relevant hardware. The computer program may be stored in a non-volatile computer readable storage medium. When the computer program is executed, the execution may include embodiments of the above-mentioned methods. Any references to a memory, a database, or another medium used in the various embodiments provided in the disclosure may include at least one of a non-volatile and a volatile memory. The nonvolatile Memory may include Read-Only Memory (ROM), magnetic tape, floppy disk, flash memory, optical memory, high-density embedded nonvolatile memory, Resistive Random Access Memory (ReRAM), Magnetic Random Access Memory (MRAM), Ferroelectric Random Access Memory (FRAM), Phase Change Memory (PCM), graphene memory, and the like. Volatile memory may include Random Access Memory (RAM), external cache memory, and the like. By way of illustration and not limitation, RAM may take many forms, such as Static Random Access Memory (SRAM) or Dynamic Random Access Memory (DRAM), among others. The databases referred in various embodiments provided herein may include at least one of relational and non-relational databases. The non-relational database may include, but is not limited to, a block chain based distributed database, and the like. The processors referred in the embodiments provided herein may be, but is not limited to, general purpose processors, central processing units, graphics processors, digital signal processors, programmable logic apparatus, quantum computing based data processing logic apparatus, and the like.

Technical features of the above-mentioned embodiments may be freely combined. To be brief in description, not all possible combinations of the technical features in the above-mentioned embodiments are described. However, the combinations of these technical features should be considered to fall within the scope of this specification as long as these combinations are not contradictory.

The above-mentioned embodiments only represent several embodiments of this disclosure, and their descriptions are specific and detailed, but should not be understood as limiting the scope of this disclosure. It should be noted that, several modifications and improvements can be made by those of ordinary skill in the art without departing from the concept of this disclosure, which belong to the protection scope of this disclosure. Therefore, it is intended that the protection scope of this disclosure shall be subjected to the appended claims.

What is claimed is:

1. A programmable pixel blending pipeline, comprising:
a raster unit, which is configured to rasterize triangles;
an output and merge unit, which is configured to combine a depth and a shading of an individual fragment, which are generated in a pixel shader, with a frame buffer;
a warp assembly unit, which is configured to assemble hardware warps;
an interpolation unit, which is configured to interpolate based on an input attribute of the pixel shader, and to send a signal indicating warp completion to an execution unit;
a pixel shader construction unit, which is configured to allocate resources needed by a warp;
an execution unit, which is configured to execute various instructions in a shader;
a warp overlap check unit, which is configured to check whether different pixels in a warp overlap;
a warp reorder unit, which is configured to sort different warps to ensure that multiple warps with overlapping pixels are executed in an order in which the multiple warps are launched; and
a pixel operation unit, which is configured to read color values of pixels in a current warp from the frame buffer, assemble the color values into a quad and return the quad to the execution unit.

2. The programmable pixel blending pipeline according to claim 1, wherein the warp overlap check unit comprises:
a triangle memory, which is configured to store a triangle in a current warp that is being assembled, wherein stored information comprises, but is not limited to, position information, pixel coverage information, and information on whether a current triangle is valid;
a control unit, which is configured to receive an input triangle and send a read request to the triangle memory;
a memory read interface and a memory write interface, which are configured to represent a read interface and a write interface of the triangle memory, where the memory write interface is further used to receive a release request sent by an external module and to mark a triangle to be released as invalid; and
a triangle overlap comparator, which is configured to determine whether there is an overlap between two triangles in screen space; wherein if there is a pixel overlap, the current warp that is being assembled is forcibly launched; otherwise, the input triangle is written to a memory and forwarded to a lower-level module.

3. The programmable pixel blending pipeline according to claim 2, wherein the warp reorder unit comprises:
an input buffer, which is configured to receive and store input triangles;
a warp splitting unit, which is configured to: determine, based on a quad number in warp information, a number of triangles in the input buffer which belong to a current warp; if one triangle spans two warps, split the triangle into two parts of sub-triangles, with a first part belonging to the current warp and a second part belonging to a next warp;
an intermediate buffer, which is configured to store all triangles comprised in the current warp;
a triangle memory, which is configured to store all triangles in a previous warp; wherein stored information comprises, but is not limited to, position information, pixel coverage information, and information on whether a current triangle is valid;
a triangle memory control unit, which is configured to control read and write operations of the memory and to release specified triangles;
a hit or miss testing unit, which is configured to: compare triangles in the current warp with those in the triangle memory; if there is an overlap between these two types of triangles in screen space, determine a hit; otherwise, determine a miss; wherein if the result is a hit, the current warp is blocked from entering the triangle memory; if the result is a miss, all triangles in the current warp are written into the triangle memory, and at the same time, a launch signal is sent to the pixel operation unit; and
a traversal unit, which is configured to traverse all triangles in the intermediate buffer and write them to the triangle memory, while sending a launch signal to a lower-level module.

4. The programmable pixel blending pipeline according to claim 3, wherein the pixel operation unit comprises:
an address calculation unit, which is configured to calculate an address of each pixel in a storage space;
a memory access interface, which is an interface to access a physical space where the frame buffer is located;
a pixel color buffer, which is configured to receive and store data returned by the frame buffer;
a quad assembly unit, which is configured to read color values of a current quad from a pixel buffer, and to assemble the color values into a quad;
a format conversion unit, which is configured to convert a pixel storage format of a rendering object into a data format required by the execution unit;
a quad merging unit, which is configured to assemble a maximum quantity of quad data according to a width of the interface and to send the quad data to the execution unit; wherein after the colors of all pixels in the current warp are returned to the execution unit, a signal indicating a completion of the warp is sent to the execution unit which starts executing an instruction in the warp after receiving the signal.

5. A programmable pixel blending method, which is applied to a programmable pixel blending pipeline, wherein the programmable pixel blending pipeline comprises:
a raster unit, which is configured to rasterize triangles;
an output and merge unit, which is configured to combine a depth and a shading of an individual fragment, which are generated in a pixel shader, with a frame buffer;
a warp assembly unit, which is configured to assemble hardware warps;
an interpolation unit, which is configured to interpolate based on an input attribute of the pixel shader, and to send a signal indicating warp completion to an execution unit;
a pixel shader construction unit, which is configured to allocate resources needed by a warp;
an execution unit, which is configured to execute various instructions in a shader;
a warp overlap check unit, which is configured to check whether different pixels in a warp overlap;
a warp reorder unit, which is configured to sort different warps to ensure that multiple warps with overlapping pixels are executed in an order in which the multiple warps are launched; and
a pixel operation unit, which is configured to read color values of pixels in a current warp from the frame buffer, assemble the color values into a quad and return the quad to the execution unit;

wherein the programmable pixel blending method comprises:

performing rasterization on a first triangle, a second triangle, and a third triangle via the raster unit to obtain triangle coverage information of each triangle;

sending the triangle coverage information to the warp assembly unit and the warp reorder unit respectively; assembling, by the warp assembly unit, the first triangle and the second triangle into a first warp, and requesting a warp from a warp request interface based on information of the first warp;

executing the first warp based on a warp information cache, a warp synchronization unit, the warp reorder unit, the pixel operation unit, the interpolation unit, and the execution unit;

after the first warp is executed, continuing to assemble, by the warp assembly unit, the third triangle and completing a rendering of the third triangle.

6. The programmable pixel blending method according to claim 5, wherein, the executing the first warp based on a warp information cache, a warp synchronization unit, the warp reorder unit, the pixel operation unit, the interpolation unit, and the execution unit comprises:

receiving and storing information of the first warp by the warp information cache; reading corresponding triangles from the input buffer based on the information of the first warp, and sending the information of the first warp to the warp reorder unit and the interpolation unit by the warp synchronization unit;

performing a hit or miss test based on the received information of the first warp information by the warp reorder unit; if the test result is a miss, sending a launch signal to the pixel operation unit;

reading color values of pixels in the first warp from the frame buffer and sending the color values to the execution unit, by the pixel operation unit;

performing, by the interpolation unit, interpolation on the pixels inside the triangles based on received triangle information of the first warp and a way of interpolation of an input attribute specified in the pixel shader, and sending an interpolation result to the execution unit by the interpolation unit;

executing, by the execution unit, various instructions in the pixel shader based on input attribute values of each quad in the information of the first warp and the color values returned by the pixel operation unit, and sending the color values to an output and merge unit after execution by the execution unit; and writing color data into the frame buffer and sending a request of releasing the first warp to the warp reorder unit, by the output and merge unit.

7. The programmable pixel blending method according to claim 6, wherein the continuing to assemble, by the warp assembly unit, the third triangle and completing a rendering of the third triangle comprises:

assembling the third triangle into a second warp by the warp assembly unit, and performing, by the warp reorder unit, a hit or miss test based on received information of the second warp; if a test result is a miss, sending a launch signal to the pixel operation unit;

reading color values of pixels in the second warp from the frame buffer and sending the color values to the execution unit, by the pixel operation unit;

performing, by the interpolation unit, interpolation on the pixels inside the triangle based on received triangle information of the second warp and a way of interpolation of an input attribute specified in the pixel shader, and sending an interpolation result to the execution unit by the interpolation unit;

executing, by the execution unit, various instructions in the pixel shader based on input attribute values of each quad in the information of the second warp and the color values returned by the pixel operation unit, and sending the color values to the output and merge unit after execution by the execution unit;

writing color data into the frame buffer and sending a request of releasing the second warp to the warp reorder unit, by the output and merge unit.

8. A programmable pixel blending apparatus, comprising a storage and a processor, a computer program being stored in the storage, wherein the processor, when executing the computer program, performs steps of the programmable pixel blending method of claim 5.

9. The programmable pixel blending apparatus of claim 8, wherein the executing the first warp based on a warp information cache, a warp synchronization unit, the warp reorder unit, the pixel operation unit, the interpolation unit, and the execution unit comprises:

receiving and storing information of the first warp by the warp information cache; reading corresponding triangles from the input buffer based on the information of the first warp, and sending the information of the first warp to the warp reorder unit and the interpolation unit by the warp synchronization unit;

performing a hit or miss test based on the received information of the first warp information by the warp reorder unit; if the test result is a miss, sending a launch signal to the pixel operation unit;

reading color values of pixels in the first warp from the frame buffer and sending the color values to the execution unit, by the pixel operation unit;

performing, by the interpolation unit, interpolation on the pixels inside the triangles based on received triangle information of the first warp and a way of interpolation of an input attribute specified in the pixel shader, and sending an interpolation result to the execution unit by the interpolation unit;

executing, by the execution unit, various instructions in the pixel shader based on input attribute values of each quad in the information of the first warp and the color values returned by the pixel operation unit, and sending the color values to an output and merge unit after execution by the execution unit; and writing color data into the frame buffer and sending a request of releasing the first warp to the warp reorder unit, by the output and merge unit.

10. The programmable pixel blending apparatus of claim 9, wherein the continuing to assemble, by the warp assembly unit, the third triangle and completing a rendering of the third triangle comprises:

assembling the third triangle into a second warp by the warp assembly unit, and performing, by the warp reorder unit, a hit or miss test based on received information of the second warp; if a test result is a miss, sending a launch signal to the pixel operation unit;

reading color values of pixels in the second warp from the frame buffer and sending the color values to the execution unit, by the pixel operation unit;

performing, by the interpolation unit, interpolation on the pixels inside the triangle based on received triangle information of the second warp and a way of interpolation of an input attribute specified in the pixel shader, and sending an interpolation result to the execution unit by the interpolation unit;

executing, by the execution unit, various instructions in the pixel shader based on input attribute values of each quad in the information of the second warp and the color values returned by the pixel operation unit, and sending the color values to the output and merge unit after execution by the execution unit;

writing color data into the frame buffer and sending a request of releasing the second warp to the warp reorder unit, by the output and merge unit.

11. A non-transitory computer readable storage medium, which stores a computer program therein, wherein the computer program, when being executed by a processor, implements steps of the programmable pixel blending method of claim 5.

12. The non-transitory computer readable storage medium of claim 11, wherein the executing the first warp based on a warp information cache, a warp synchronization unit, the warp reorder unit, the pixel operation unit, the interpolation unit, and the execution unit comprises:

receiving and storing information of the first warp by the warp information cache; reading corresponding triangles from the input buffer based on the information of the first warp, and sending the information of the first warp to the warp reorder unit and the interpolation unit by the warp synchronization unit;

performing a hit or miss test based on the received information of the first warp information by the warp reorder unit; if the test result is a miss, sending a launch signal to the pixel operation unit;

reading color values of pixels in the first warp from the frame buffer and sending the color values to the execution unit, by the pixel operation unit;

performing, by the interpolation unit, interpolation on the pixels inside the triangles based on received triangle information of the first warp and a way of interpolation of an input attribute specified in the pixel shader, and sending an interpolation result to the execution unit by the interpolation unit;

executing, by the execution unit, various instructions in the pixel shader based on input attribute values of each quad in the information of the first warp and the color values returned by the pixel operation unit, and sending the color values to an output and merge unit after execution by the execution unit; and writing color data into the frame buffer and sending a request of releasing the first warp to the warp reorder unit, by the output and merge unit.

13. The non-transitory computer readable storage medium of claim 12, wherein the continuing to assemble, by the warp assembly unit, the third triangle and completing a rendering of the third triangle comprises:

assembling the third triangle into a second warp by the warp assembly unit, and performing, by the warp reorder unit, a hit or miss test based on received information of the second warp; if a test result is a miss, sending a launch signal to the pixel operation unit;

reading color values of pixels in the second warp from the frame buffer and sending the color values to the execution unit, by the pixel operation unit;

performing, by the interpolation unit, interpolation on the pixels inside the triangle based on received triangle information of the second warp and a way of interpolation of an input attribute specified in the pixel shader, and sending an interpolation result to the execution unit by the interpolation unit;

executing, by the execution unit, various instructions in the pixel shader based on input attribute values of each quad in the information of the second warp and the color values returned by the pixel operation unit, and sending the color values to the output and merge unit after execution by the execution unit;

writing color data into the frame buffer and sending a request of releasing the second warp to the warp reorder unit, by the output and merge unit.

\* \* \* \* \*